United States Patent
Wu et al.

(10) Patent No.: US 11,531,869 B1
(45) Date of Patent: Dec. 20, 2022

(54) NEURAL-NETWORK POOLING

(71) Applicant: Xilinx, Inc., San Jose, CA (US)

(72) Inventors: Ephrem C. Wu, San Mateo, CA (US); David Berman, San Jose, CA (US); Xiaoqian Zhang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 826 days.

(21) Appl. No.: 16/368,397

(22) Filed: Mar. 28, 2019

(51) Int. Cl.
*G06N 3/063* (2006.01)
*G06N 3/04* (2006.01)

(52) U.S. Cl.
CPC ............... *G06N 3/063* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 9,779,786 B1 | 10/2017 | Wu et al. | |
| 2018/0039886 A1 | 2/2018 | Umuroglu et al. | |
| 2018/0165574 A1* | 6/2018 | Young | G06F 7/5443 |
| 2018/0203956 A1 | 7/2018 | Ng et al. | |
| 2019/0042251 A1* | 2/2019 | Nurvitadhi | G06N 3/02 |
| 2019/0057305 A1 | 2/2019 | Denolf et al. | |
| 2019/0065112 A1* | 2/2019 | Schmisseur | G06F 11/3409 |
| 2019/0311243 A1* | 10/2019 | Whatmough | G06N 3/0454 |
| 2019/0325297 A1* | 10/2019 | Fowers | G06N 3/08 |
| 2019/0340486 A1* | 11/2019 | Mills | G06F 7/5443 |
| 2020/0104692 A1* | 4/2020 | Hill | G06F 5/06 |
| 2020/0257955 A1* | 8/2020 | Naderiparizi | G06F 3/0676 |

OTHER PUBLICATIONS

"Ma, (Optimizing the convolution operation to accelerate deep neural networks on FPGA), Apr. 3, 2018" (Year: 2018).*
Specification and drawings for U.S. Appl. No. 15/923,950, filed Mar. 16, 2018, Wu et al.
Jarrett, K. et al., "What is the Best Multi-Stage Architecture for Object Recognition?", IEEE 12th Int. Conf. Computer Vision (ICCV), Oct. 2009, pp. 2146-2153.
Krizhevsky, A. et al. "ImageNet Classification with Deep Convolutional Neural Networks," in NIPS Proc., 2012, pp. 1-9, https://papers.nips.cc/paper/4824-imagenet-classification-with-deep-convolutional-neural-networks.pdf.

(Continued)

*Primary Examiner* — Nicholas Klicos
*Assistant Examiner* — Michael Aaron Merabi
(74) *Attorney, Agent, or Firm* — Patterson + Sheridan, LLP (57) ABSTRACT

Embodiments herein describe circuitry with improved efficiency when executing layers in a nested neural network. As mentioned above, a nested neural network has at least one split operation where a tensor generated by a first layer is transmitted to, and processed by several branches in the neural network. Each of these branches can have several layers that have data dependencies which result in a multiply-add array sitting idly. In one embodiment, the circuitry can include a dedicated pre-pooler for performing a pre-pooling operation. Thus, the pre-pooling operation can be performing in parallel with other operations (e.g., the convolution performed by another layer). Once the multiply-add array is idle, the pre-pooling operation has already completed (or at least, has already started) which means the time the multiply-add array must wait before it can perform the next operation is reduced or eliminated.

20 Claims, 8 Drawing Sheets

(56) References Cited

OTHER PUBLICATIONS

Simonyan, K. et al., "Very Deep Convolutional Networks for Large-Scale Image Recognition," ICLR 2015, Apr. 10, 2015, pp. 1-14, https://arxiv.org/abs/1409.1556.

Szegedy, C. et al., "Going deeper with convolutions," IEEE CVPR, Jun. 2015, pp. 1-9.

Szegedy, C. et al., "Rethinking the Inception Architecture for Computer Vision," IEEE CVPR, Dec. 2, 2015, pp. 1-10, https://arxiv.org/abs/1512.00567.

* cited by examiner

| TENSOR BUFFER MEMORY PAGES | WRITE PORT -1 (MODULE m-1) | READ PORT 0 (MODULE m) | WRITE PORT 0 (MODULE m) | READ PORT 1 (MODULE m) | WRITE PORT 1 (MODULE m) |
|---|---|---|---|---|---|
| $X_0^{(m)}$ | x | x | | | |
| $X_1^{(m)}$ | x | x | | | |
| $P_0^{(m)}$ | | x | | | x |
| $B_0^{(m)}$ | | x | x | | |
| $B_1^{(m)}$ | | x | x | | |
| $B_2^{(m)}$ | | OPTIONAL | x | X (IF NOT READ BY PORT 0) | |
| $X_0^{(m+1)}$ | | | x | | |
| $X_1^{(m+1)}$ | | | x | | |

FIG. 8

NEURAL-NETWORK POOLING

TECHNICAL FIELD

Examples of the present disclosure generally relate to circuitry for executing a nested neural network.

BACKGROUND

Neural networks can be thought of as a computer graph formed from interconnected layers. Nested neural networks are neural networks that include splits that form sub-graphs where data generated from one layer is split and transmitted to a plurality of different layers (also referred to as branches). The outputs of these branches are then merged or combined to form a single tensor which serves as an input to another layer in the nested neural network.

The branches within the sub-graphs can have multiple layers which have data dependencies. That is, a first layer in the branch cannot operate until an upstream layer in the branch has completed its operation. For example, a convolution layer cannot operate on a tensor until a reduction operation in the previous layer has completed. This data dependency, however, can result in an inefficient use of hardware resource where some hardware elements are idle for substantial periods of time.

SUMMARY

One example is an integrated circuit that includes a multiply-add array, a first pooler, a second pooler, and a tensor buffer configured to store a tensor generated by a previous layer in a neural network. The inputs of the first pooler and the multiply-add array are coupled to the tensor buffer and an output of the first pooler is coupled to an input of the tensor buffer. Moreover, an input of the second pooler is coupled to an output of the multiply-add array.

One example described herein is a circuit that includes a multiply-add array configured to perform a convolution operation for a first layer in a neural network, a pre-pooler configured to perform a pre-pooling operation for a second layer in the neural network, a post-pooler configured to perform a post-pooling operation for a third layer in the neural network, and a tensor buffer configured to store a tensor generated by a fourth layer in the neural network. Inputs of the pre-pooler and the multiply-add array are coupled to the tensor buffer and an output of the pre-pooler is coupled to the tensor buffer. Moreover, an input of the post-pooler is coupled to an output of the multiply-add array.

One example described herein is a method that includes storing a tensor outputted from a previous layer in a neural network in a tensor buffer, processing the tensor using a first lower layer in the neural network by reading the tensor from a first page of the tensor buffer, storing the processed tensor in a scratch pad page of the tensor buffer, and performing a convolution operation on the processed tensor using a multiply-add array. Further, the convolution operation corresponds to an upper layer in the neural network that is downstream from the first lower layer. The method also includes while performing the convolution operation, performing a first pooling operation corresponding to a second lower layer in the neural network by reading the tensor from the first page of the tensor buffer and, while performing the convolution and first pooling operations, performing a second pooling operation using data generated by the upper layer.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe circuitry with improved efficiency when executing layers in a nested neural network. As mentioned above, a nested neural network has at least one split operation where a tensor generated by a first layer is then transmitted to, and processed by several branches in the neural network. Each of these branches can have several layers that have data dependencies. For example, before a multiply-add area can perform a multiplication or addition operation on the tensor (e.g., a convolution operation), a pre-pooling operation must first be performed (e.g., max pooling or average pooling). The multiply-add array may sit idly while the pooling circuitry performs the pre-pooling operation.

In one embodiment, the circuitry includes a dedicated pre-pooler for performing the pre-pooling operation. Thus, the pre-pooling operation can be performed in parallel with other operations (e.g., a convolution performed by another layer). Once the multiply-add array is idle, the pre-pooling operation has already completed (or at least, has already started) which means the time the multiply-add array must wait before it can perform the next convolution operation is reduced or eliminated.

Figure 1:
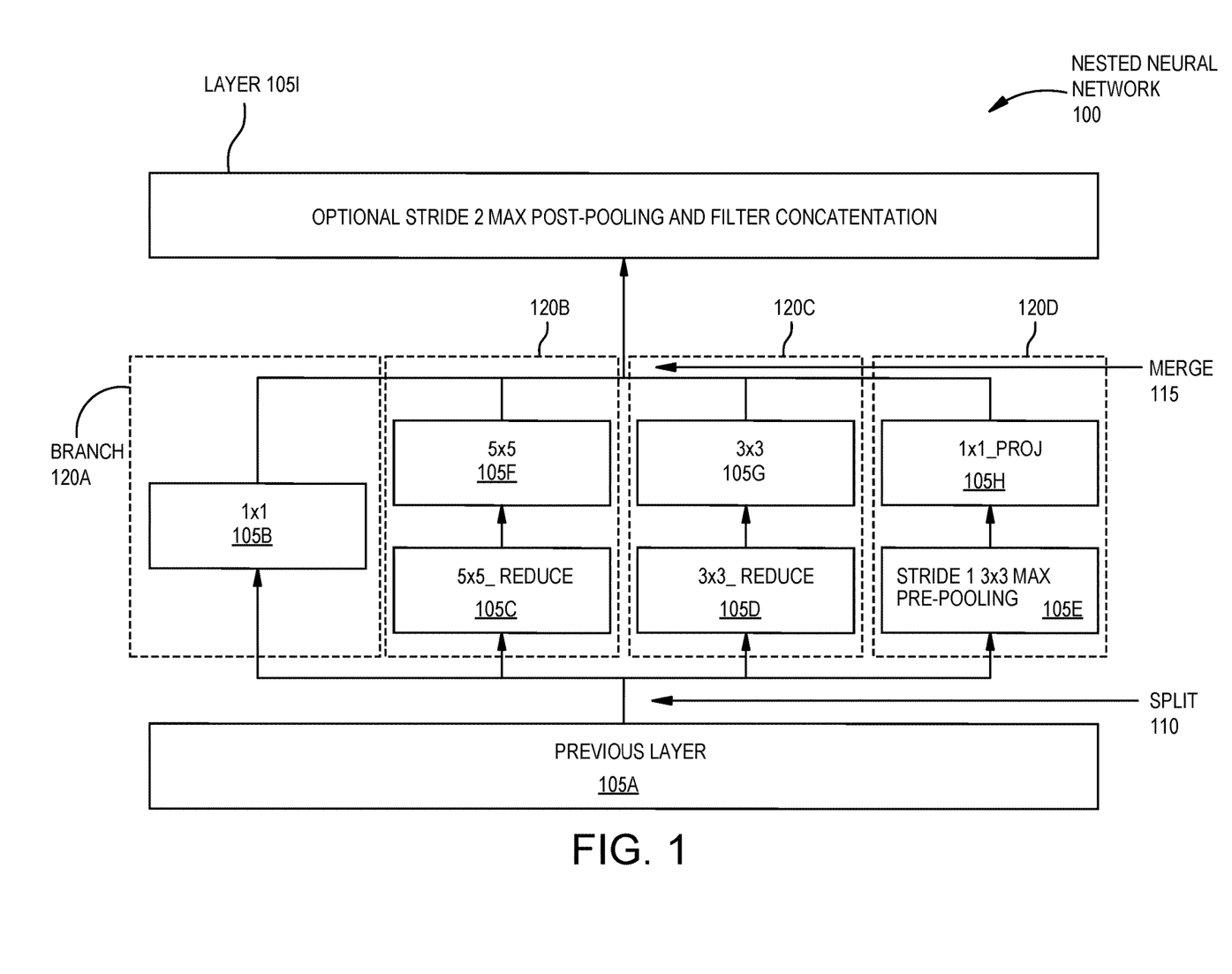
FIG. 1 illustrates a nested neural network, according to an example.

FIG. 1 illustrates a nested neural network 100, according to an example. The neural network 100 includes a first layer 105A which outputs a tensor. Generally, the tensor is a data structure that stores information processed by the layers in the neural network. In one example, the tensor is a multi-dimensional array (e.g., a 1D array or matrix). A split operation 110 is performed where the tensor outputted by the layer 105A is processed by multiple different branches 120. Each of these branches can include one or more different layers 105. For example, the branch 120A includes the layer 105B which performs a 1×1 convolution on the tensor while the branch 120B includes the layers 105C and 105F which perform a 5×5 reduction operation and a 5×5 convolution operation, respectively.

The outputs of the branches 120 are then recombined by a merge operation 115 to form a tensor that is provided to the layer 105I for further processing. A nested neural network is any neural network where the output of one layer (e.g., layer 105A) is processed in multiple branches 120. The outputs of these branches 120 may then be merged or concatenated to form a single tensor.

The branches 120 with multiple layers—i.e., the branches 120B-D—have data dependencies where the downstream layers (e.g., the layers 105F-H) must first wait for the upstream layers (e.g., the layers 105C-E) to process the tensor data. For example, the layer 105E performs a stride 1 3×3 max pre-pooling operation where, for a 3×3 chunk of the tensor, the layer 105E determines the maximum value. The stride refers to how the layer shifts the 3×3 chunk as it moves through the tensor data. A stride 1 means the 3×3 chunk shifts by one during each max pooling operation. The reduction and max pooling operations are helpful to reduce the amount of data in the tensor which then reduces the time required to perform convolution in the downstream layers (layers 105F-H) although this may slightly reduce accuracy.

The data dependency in the branches 120, however, can reduce the efficiency of the hardware executing the nested neural network 100. That is, the pre-pooling operation of layer 105E may be performed by different circuitry than the convolution operation of the layer 105H. Thus, while the pre-pooling operation is performed, the circuitry tasked with performing convolution for the layer 105H may be idle.

Figure 2:
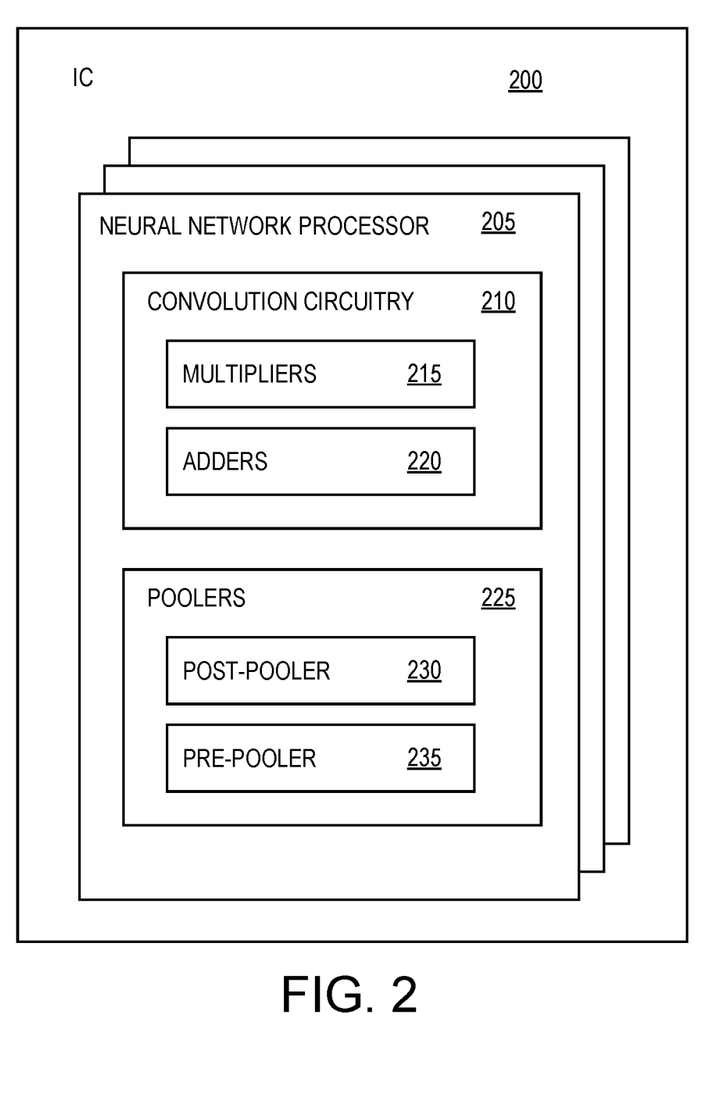
FIG. 2 is a block diagram of an integrated circuit for executing a nested neural network, according to an example.

FIG. 2 is a block diagram of an integrated circuit (IC) 200 for executing a nested neural network, according to an example. The IC 200 includes multiple neural network processors 205 which each include convolution circuitry 210 and poolers 225. Although convolution circuitry 210 and poolers 225 are specifically shown, the IC 200 may include specialized circuitry for performing other tasks in a neural network. Further, in one embodiment, the IC 200 can be an application specific integrated circuit (ASIC) which has hardened circuitry forming the convolution circuitry 210 and the poolers 225. However, in another embodiment, the IC 200 may be a programmable IC (e.g., a field programmable gate array (FPGA) or programmable logic circuit) where the circuitry forming the convolution circuitry 210 and poolers 225 is programmable logic (e.g., configurable logic blocks, look-up tables, etc.).

The convolution circuitry 210 includes multipliers 215 and adders 220. In one embodiment, the multipliers 215 and adders 220 form a multiply-add array that performs convolution.

The poolers 225 include a post-pooler 230 and a pre-pooler 235. As described in more detail below, by having a separate pooler for performing a pre-pooler operation (i.e., the pre-pooler 235), the IC 200 can address the inefficiency mentioned above caused by the data dependencies in the branches of a nested neural network. In one embodiment, the pre-pooler 235 can perform a pre-pooling operation in parallel with other operations so that the data is ready for performing convolution sooner than it would be otherwise. This may reduce the idle time of the multipliers 215 and adders 220 in the convolution circuitry 210. To better explain the inefficiency caused by the data dependencies in the nested neural network, FIG. 3A illustrates a hardware design that does not include a separate pre-pooler 235.

Figure 3A:
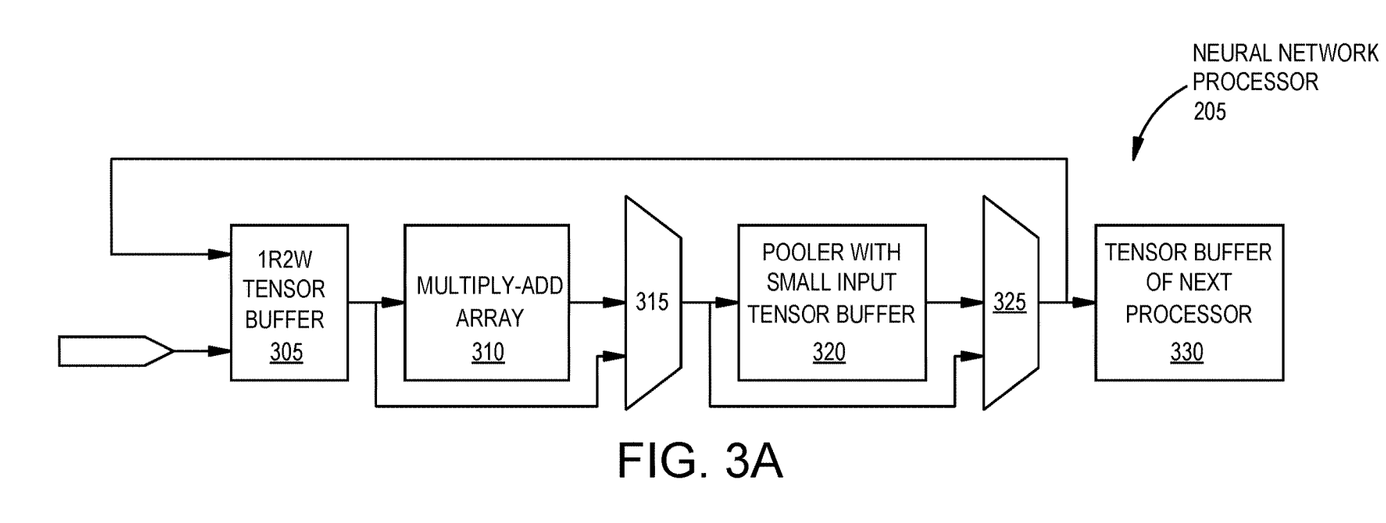
FIG. 3A illustrates circuitry for executing layers in a nested neural network, according to an example.

FIG. 3A illustrates circuitry for a neural network processor 205 for executing layers in a nested neural network, according to an example. The neural network processor 205 includes a one read two write (1R2 W) tensor buffer 305 which stores the tensor buffer received from a previous layer. The tensor buffer 305 is communicatively coupled to a multiply-add array 310 which may be formed from the multipliers 215 and adders 220 discussed in FIG. 2. In one embodiment, when performing a convolution operation for one of the layers in the neural network, the multiply-add array 310 retrieves the relevant data from the tensor stored in the tensor buffer 305.

In addition, the neural network processor 205 includes a bypass path that permits the output of the buffer 305 to bypass the multiply-add array 310 and reach a multiplexer (mux) 315. By controlling the select signal on the mux 315, the circuit can determine whether the data generated by the multiply-add array 310 or the data directly retrieved from the tensor buffer 305 reaches a pooler 320. In some embodiments, the tensor is first processed by the multiply-add array 310 before reaching the pooler 320, but in other embodiments the pooler 320 processes data received directly from the tensor buffer 305 via the bypass path.

The neural network processor 205 also includes a bypass path around the pooler 320. A mux 325 controls whether the data from the bypass path of the data outputted by the pooler 320 reaches a tensor buffer 330 for the next neural network processor.

Figure 3B:
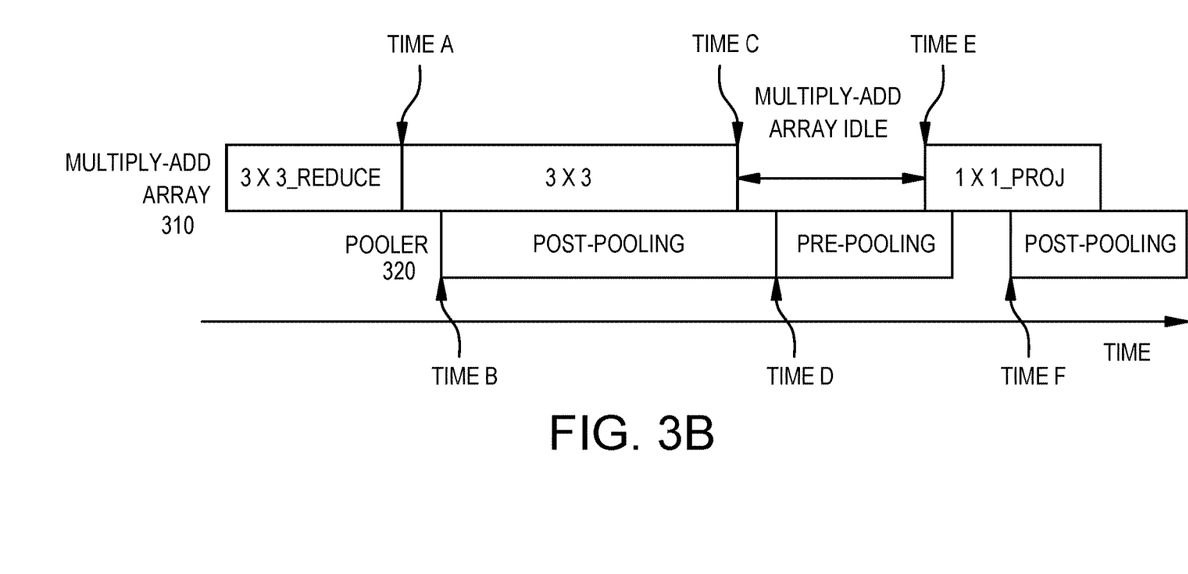
FIG. 3B illustrates usage times of the circuitry in FIG. 3A, according to an example.

FIG. 3B illustrates usage times of the circuitry in FIG. 3A, according to an example. For clarity, the usage times are discussed using some of the layers 105 in the nested neural network illustrated in FIG. 1. In this case, at Time A, the multiply-add array 310 has finished before the 3×3 reduction operation of the layer 105D and switches to performing the 3×3 convolution operation of the layer 105G. For example, the multiply-add array 310 can perform the 3×3 reduction operation and then use the bypath path around the pooler 320 so that the data is stored in the 1R2 W tensor buffer 305. At Time A, the multiply-add array 310 then retrieves that data from the buffer 305 and performs the 3×3 convolution operation for the layer 105G. Thus, the multiply-add array 310 experiences very little, or no, idle time.

At Time B, while the multiply-add array 310 performs the 3×3 convolution operation, the mux 315 forwards the output data (with some processing delay) to the pooler 320 which performs the post-pooling operation corresponding to the layer 105I. That is, the multiply-add array 310 generates a stream of data when performing the 3×3 convolution which is forwarded to the pooler 320 for post-pooling (without first being stored in the tensor buffer 305). At Time C the multiply-add array 310 completes the 3×3 convolution and after some delay, at Time D, the pooler 320 completes the post pooling operation on the data generated from the layer 105G. This data is stored in the tensor buffer 330 for the next processor.

In addition, at Time D the bypass path around the multiply-add array 310 is used to retrieve the tensor data from the tensor buffer 305 for the pooler 320 so that the pre-pooling operation corresponding to layer 105E can be performed. That is, in this example, the post-pooling for the layer 105I is first completed before the pre-pooling for the layer 105E begins. Pre-pooling requires time to prepare a tensor that is consumable by the 1×1 projection operation corresponding to layer 105H which results in the multiply-add array 310 being idle.

Because of the data dependency between the pre-pooling operation in the layer 105E and the operation in the layer 105H, the multiply-add array is idle between Time C and Time E when data generated by the pooler 320 when performing the pre-pooling operation is stored in the tensor buffer 305 and can be retrieved by the multiply-add array. At Time E, the multiply-add array 310 can begin performing the 1×1 projection operation for the layer 105H. That is, the pre-pooling operation stores intermediate tensor data in the tensor buffer 305 that the multiply-add array 310 can then retrieve to perform the 1×1 projection operation. As that operation continues, after some delay at Time F the pooler 320 (which has since finished the pre-pooling operation) can receive the data generated by the multiply-add array 310 and perform the post-pooling operation corresponding to the layer 105I for the data generated by the layer 105H.

Thus, the timing chart in FIG. 3B illustrates a multiply-add array idle time between Time C and Time E where the array 310 is idle waiting for the pre-pooling operation to store data in the tensor buffer 305. In one embodiment, to reduce or eliminate the multiply-add array idle time, the pre-pooling operation could be performed while the 3×3 reduction operation is performed before Time A when the pooler 320 is idle. However, this means the 3×3 reduction operation and the pre-pooling operation are accessing the same tensor data. That is, as illustrated in FIG. 1, the layer 105B which performs the 3×3 reduce operation and the layer 105E which performs the pre-pooling operation both operate on the tensor outputted by the layer 105A. Since this tensor is stored in the tensor buffer 305, this means another read port would need to be added to the tensor buffer 305 so it can be read simultaneously by the multiply-add array 310 (to perform the 3×s reduce operation) and the pooler 320 (to perform the pre-pooling operation). This increases the cost of the tensor buffer 305. Moreover, the layers access the tensor in a different order which complicates the circuitry in the processor 205. Instead, the embodiments below describe adding a separate pooler that may be a less expensive option that reduces the idle time of the array and does not require processing the data in a different order.

Figure 4A:
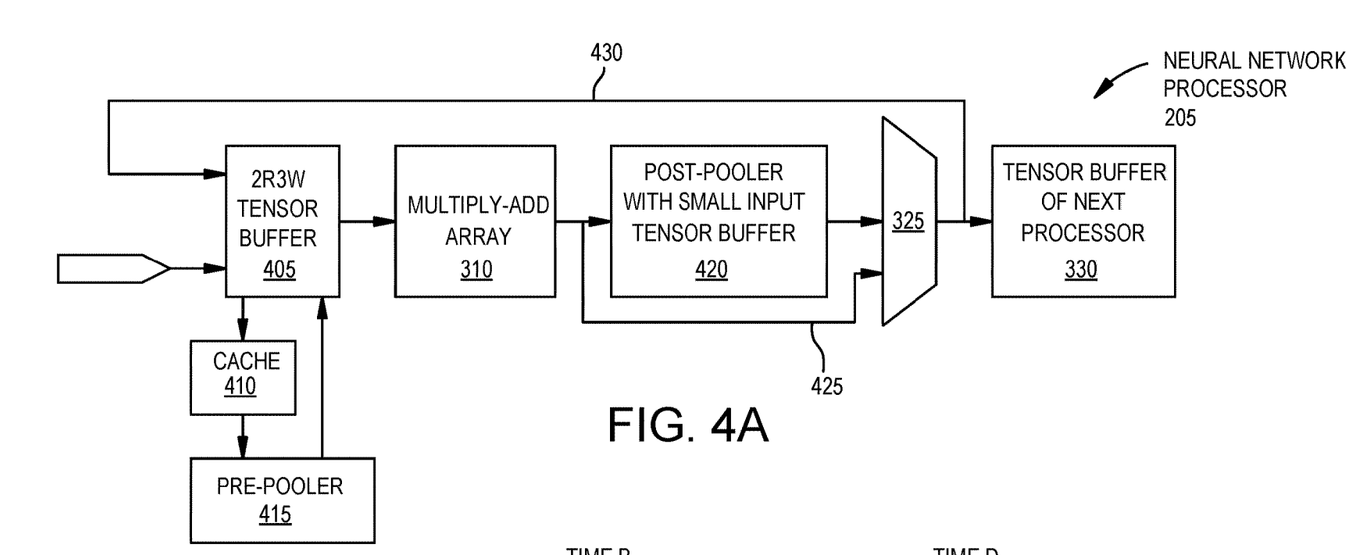
FIG. 4A illustrates circuitry for executing layers in a nested neural network, according to an example.

FIG. 4A illustrates circuitry for executing layers in a nested neural network, according to an example. The neural network processor 205 in FIG. 4A includes a 2R3 W tensor buffer 405 rather than the 1R2 W tensor buffer 305 in FIG. 3A. While the 2R3 W tensor buffer 405 is labeled as having two read ports (which would increase the cost significantly), in one embodiment, the memory banks in the tensor buffer 405 do not have two read ports which reduces the cost of the buffer 405 but simultaneously permits the buffer 405 to be read from by two circuits in parallel as described in more detail below.

The processor 205 also includes a cache 410 which reads data from the tensor buffer 405 that is then processed by a pre-pooler 415. The pre-pooler 415 is separate from a post-pooler 420. Like in FIG. 3A, the multiply-add array 310 receives data from tensor buffer 405 which is then processed and provided to the post-pooler 420. Because the circuitry in FIG. 4A has the pre-pooler 415, there is no bypass path around the multiply-add array 310 like in FIG. 3A. However, there is still a bypass path 425 around the post-pooler 420 so the data outputted by the multiply-add array 310 can bypass the post-pooler 420 (as is the case when performing the operations in layers 105E and 105D in FIG. 1).

In addition, the output of the mux 325 is coupled to both the tensor buffer 330 of the next neural network processor and a feedback path 430. The feedback path 430 permits the data generated by the post-pooler 420 as well as the data generated by the multiply-add array 310 (which bypasses the post-pooler 420 using the bypass path 425) to be stored in the tensor buffer 405.

Figure 4B:
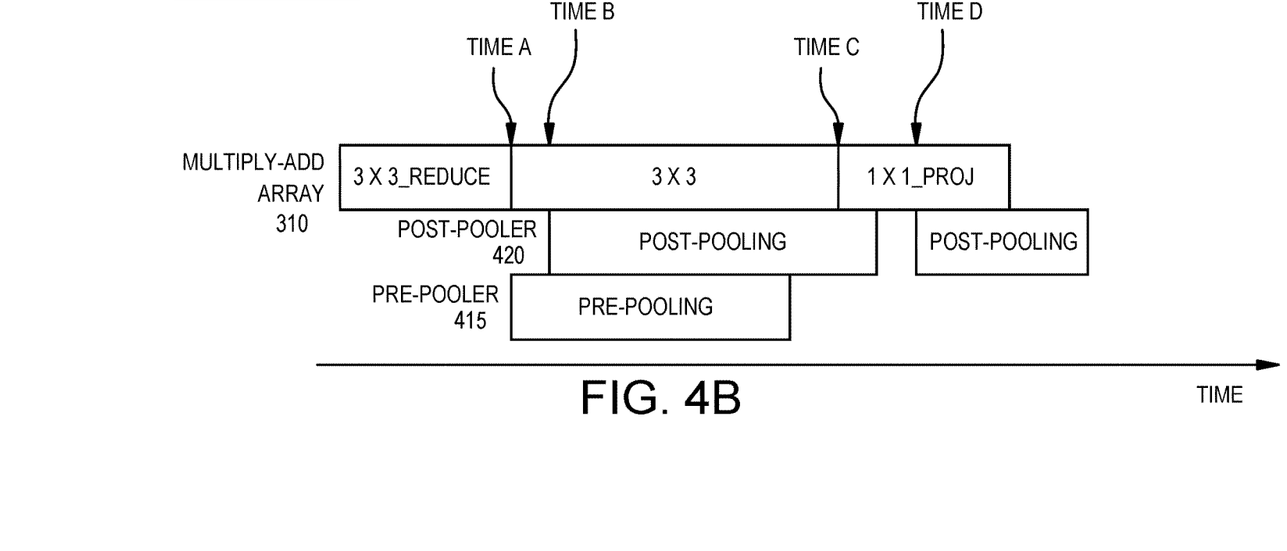
FIG. 4B illustrates usage times of the circuitry in FIG. 4A, according to an example.

FIG. 4B illustrates usage times of the circuitry in FIG. 4A, according to an example. At Time A, the 3×3 reduction operation of layer 105D completes in the multiply-add array 310 and the tensor is again retrieved from the tensor buffer 405 to perform the 3×3 convolution operation corresponding to the layer 105G. In parallel, because the tensor buffer is a 2R buffer 405, the tensor is provided to the cache 410 which forwards the data to the pre-pooler 415 to perform the pre-pooling operation of the layer 105E. Put differently, because the multiply-add array 310 can read tensor data from the tensor buffer 405 at the same time as the cache 410, pre-pooling can occur in parallel with convolution, reduction, and projection operations performed by the array 310. Moreover, as described in more detail below, the memory banks in the tensor buffer do not all need two read ports in order for the tensor buffer 405 to be a 2R memory element.

After a short delay, at Time B, the post-pooler 420 receives the data outputted by the multiply-add array 310 when performing the 3×3 convolution operation of layer 105G and performs the post-pooling operation of the layer 105I on the resulting data.

At Time C, the 3×3 convolution operation is complete thereby freeing the multiply-add array 310 to perform the 1×1 projection operation of the layer 105H. Moreover, the pre-pooling operation for the layer 105E has also completed thereby satisfying the data dependency between the layer 105E and the layer 105H. Put differently, the pre-pooler 415 has already performed the pre-pooling operation and stored the resulting intermediate data in the tensor buffer 405. Thus, at Time C, the multiply-add array 310 can retrieve the intermediate data and perform the 1×1 projection operation. As a result, the multiply array idle time illustrated in FIG. 3B has been eliminated by using the circuitry illustrated in FIG. 4A.

Although FIG. 4A illustrates circuitry for executing nested neural networks to improve the efficiency of the multiply-add array as shown in FIG. 4B, the circuitry described herein can be used with other neural networks (e.g., non-nested neural networks) that do not include the nested branches 120 illustrated in FIG. 1.

Figure 5:
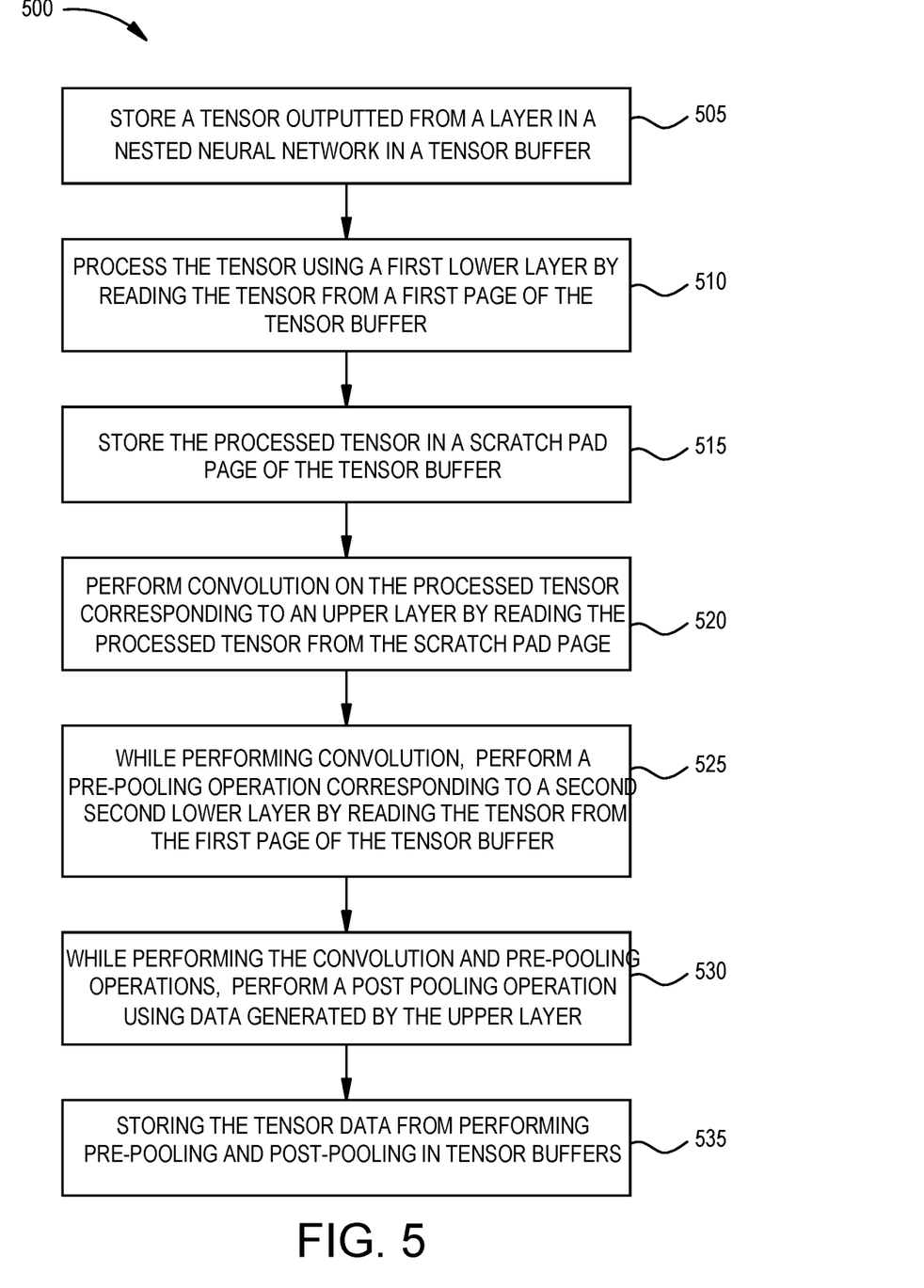
FIG. 5 is a flowchart for executing multiple layers in a branch of a nested neural network, according to an example.

FIG. 5 is a flowchart of a method 500 for executing multiple layers in a branch of a nested neural network, according to an example. For clarity, the blocks in the method 500 are discussed using the nested neural network 100 illustrated in FIG. 1 and circuitry of the neural network processor 205 illustrated in FIG. 4A.

At block 505, the tensor buffer 405 stores a tensor outputted from a layer in a nested neural network. As an example, the layer may be the previous layer 105A in FIG. 1 where the tensor outputted by this layer is then stored in the tensor buffer 405 so it is accessible when performing the operations corresponding to the layers 105B-E.

At block 510, the multiply-add array processes the tensor using a first lower layer (e.g., layer 105D in branch 120C) by reading the tensor from a first page of the tensor buffer 405. In one embodiment, the tensor buffer 405 has multiple pages which may be designated for different uses. The first page is designated for storing the tensor received from the previous layer 105A while other pages in the buffer 405 are designated for other purposes as described below.

At block 515, the multiply-add array stores the processed tensor data in a scratch pad page of the tensor buffer 405. That is, the data generated by the multiply-add array 310 by performing block 510 is stored in the scratch pad page. For example, using the bypass path, the data generated by the multiply-add array 310 when performing the 3×3 reduce operation can bypass the post-pooler 420 and then use the mux 325 to store that data in the scratch pad page of the tensor buffer 405.

Figure 6:
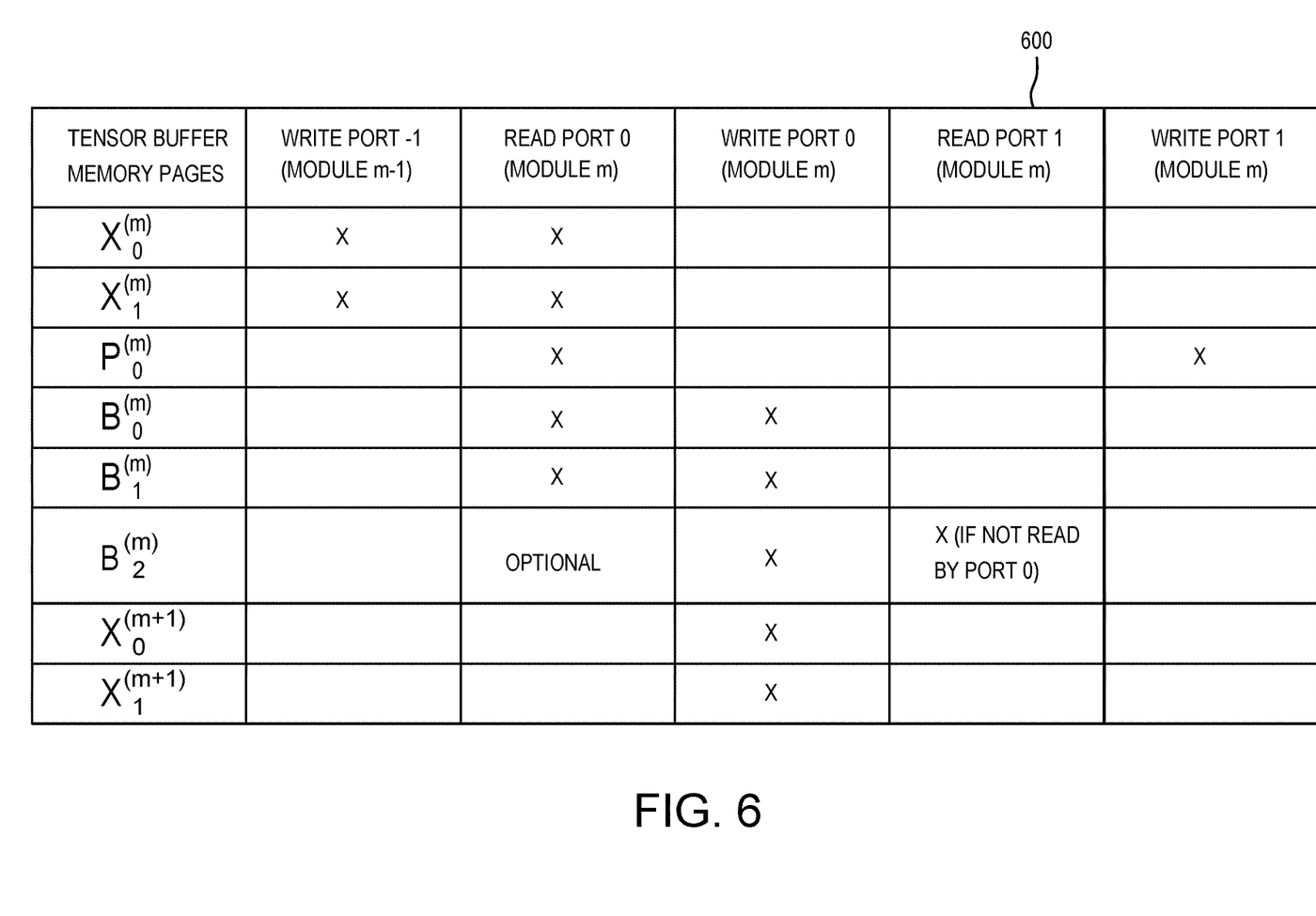
FIG. 6 is a table describing a 2R3 W tensor buffer, according to an example.

FIG. 6 is a table 600 describing a 2R3 W tensor buffer, according to an example. The left column illustrates the different pages in the tensor buffer (e.g., the 2R3 W tensor buffer 405). In one embodiment, the $X_0$, $X_1$, $B_0$, and $B_1$ pages are dedicated for storing the tensor received from the previous layer. For example, the $B_0$, and $B_1$ memory page may be used to store concatenated tensors from the previous neural network processor. For example, the tensor may be read from one of the $B_0$, and $B_1$ pages while data generated from processing the tensor buffer can be stored in another one of these pages in parallel. In one embodiment, the $B_2$ memory page is used as a scratch pad memory for storing intermediate tensor data generated by the layers 105C and 105D. For example, at block 515, the processed tensor may be stored at the $B_2$ memory page.

In one embodiment, the $P_0$ memory page is dedicated to the pre-pooler for writing its processed data. That is, the pre-pooler 415 can read the tensor data provided by the previous layer from one of the $X_0$, $X_1$, $B_0$, and $B_1$ pages, perform the pre-pooling operation, and store the processed data in the $P_0$ memory page using one of the write ports. By dedicating a memory page to the pre-pooler, not all the SRAM blocks forming the memory pages in the tensor buffer 405 need two read ports. The pre-pooler 415 can use the special addresses to write to its dedicated memory page—e.g., $P_0$ memory page. As a result, the tensor buffer 405 appears to be a two read (2R) port memory even though none of the SRAM blocks forming the memory pages have two read ports (e.g., the individual SRAM blocks are 1R memory elements).

Returning to the method 500, at block 520, the multiply-add array 310 performs convolution on the processed tensor (e.g., the intermediate tensor data) corresponding to an upper layer (e.g., layer 105G) by reading the processed tensor from the scratch pad page in the tensor buffer 405. That is, the scratch pad memory page (e.g., $B_2$ in FIG. 6) stores the intermediate data generated by the lower layer in the same branch as the upper layer. In this manner, the data generated by the lower layer in a branch can be saved in the tensor buffer 405 for later retrieval to be processed by the upper layer in the same branch, thereby satisfying any data dependencies between the layers.

While convolution is specifically mentioned, the techniques herein are not limited to such. The upper layer can be any linear layer that instructs the multiply-add array to perform a multiplication or addition operation (where convolution is a type of multiplication operation). Another example of a liner layer (besides a layer that performs convolution) is a fully-connected layer that also uses the multiply-add array to perform operations. In general, the pre-pooler can operate in parallel with any linear layer that uses the multiply-add array. In contrast to linear layers, examples of non-linear layers are layers that perform average pooling or max pooling.

At block 525, while performing the convolution operation in block 520, the pre-pooler 415 performs a pooling operation corresponding to a second lower layer by reading the tensor from the first page of the tensor buffer. For example, the pre-pooling operation of layer 105E can be performed in parallel with the 3×3 convolution operation of layer 105G. That is, while the multiply-add array 310 reads the processed tensor (e.g., the intermediate tensor data) from the scratch pad using read port 1, the cache 410 and the pre-pooler 415 can read the original tensor (as received from the previous layer) from one of the $X_0$, $X_1$, $B_0$, and $B_1$ pages using read port 0. Thus, the tensor buffer 405 performs like a 2R memory element even though each memory element has only one read port.

At block 530, while performing the convolution operation at block 520 and the pre-pooling operation at block 525, the post-pooler 420 performs a post pooling operation using data generated by the upper layer. This is illustrated in FIG. 4B after Time B where the multiply-add array 310, the post-pooler 420, and the pre-pooler 415 are operating in parallel on respective operations defined by the layers 105G, 105I, and 105E. This is possible because the data generated by performing the convolution operation at block 520 on the multiply-add array 310 can be fed directly into the in-line post-pooler 420 without the data first being stored in the tensor buffer 405. In one embodiment, the output of the post-pooler 420 is stored in the tensor buffer 330 for the next neural network processor.

At block 535, the neural network processor stores the tensor data from performing pre-pooling and post-pooling in tensor buffers. In one embodiment, the resulting data from performing post-pooling is stored in the tensor buffer 330 for the next processor. As each upper layer in the branches of the nested neural network completes, the neural network processor add these values to a concatenated tensor in the tensor buffer 330 for the next neural network processor. Once all the branches have processed the tensor, the next layer in the neural network—e.g., the layer upstream from the layer 105*l* in FIG. 1—can retrieve the concatenated tensor data to perform its operation. In this manner, the output tensor data for each of the branches 120 can be combined or merged into a single concatenated tensor for the upstream layer in the nested neural network.

The tensor data generated by pre-pooling can be stored in the dedicate memory page in the tensor buffer 405—e.g., the $P_0$ memory page. For example, the pre-pooler 415 can use write port 1 to write the tensor data into the $P_0$ memory page. In parallel, the cache 410 can continue to read tensor data stored in one of the $X_0$, $X_1$, $B_0$, and $B_1$ memory pages. That is, while the pre-pooler 415 is processing and storing data in the tensor buffer 405, the cache 410 can continue to read more tensor data from the tensor buffer 405 for the pre-pooler 415 to process, thereby acting like a streaming memory device.

In parallel, the multiply-add array 310 can read from the scratch pad memory page—e.g., the $B_2$ memory page—using the read port 1. That is, the multiply-add array 310 previously stored, in the $B_2$ memory page at block 515, the processed tensor data from performing the 3×3 reduction operation thereby enabling the multiply-add array 310 to read the processed tensor data from the $B_2$ memory page using read port 1 while the cache 410 reads tensor data from the $X_0$, $X_1$, $B_0$, or $B_1$ memory pages using read port 0 in parallel. Thus, the tensor buffer 405 can behave like a 2R memory element even though the individual memory pages (and the SRAM blocks forming those pages) have only one read port.

While adding the $P_0$ memory page for storing the data generated by the pre-pooler 415 and the $B_2$ memory page for storing the intermediate tensor data generated by the lower layers in the branches increases the size of the tensor buffer 405, the tensor buffer 405 does not need SRAM blocks with multiple read ports which may reduce the overall cost of the neural network processor 205.

Figure 7:
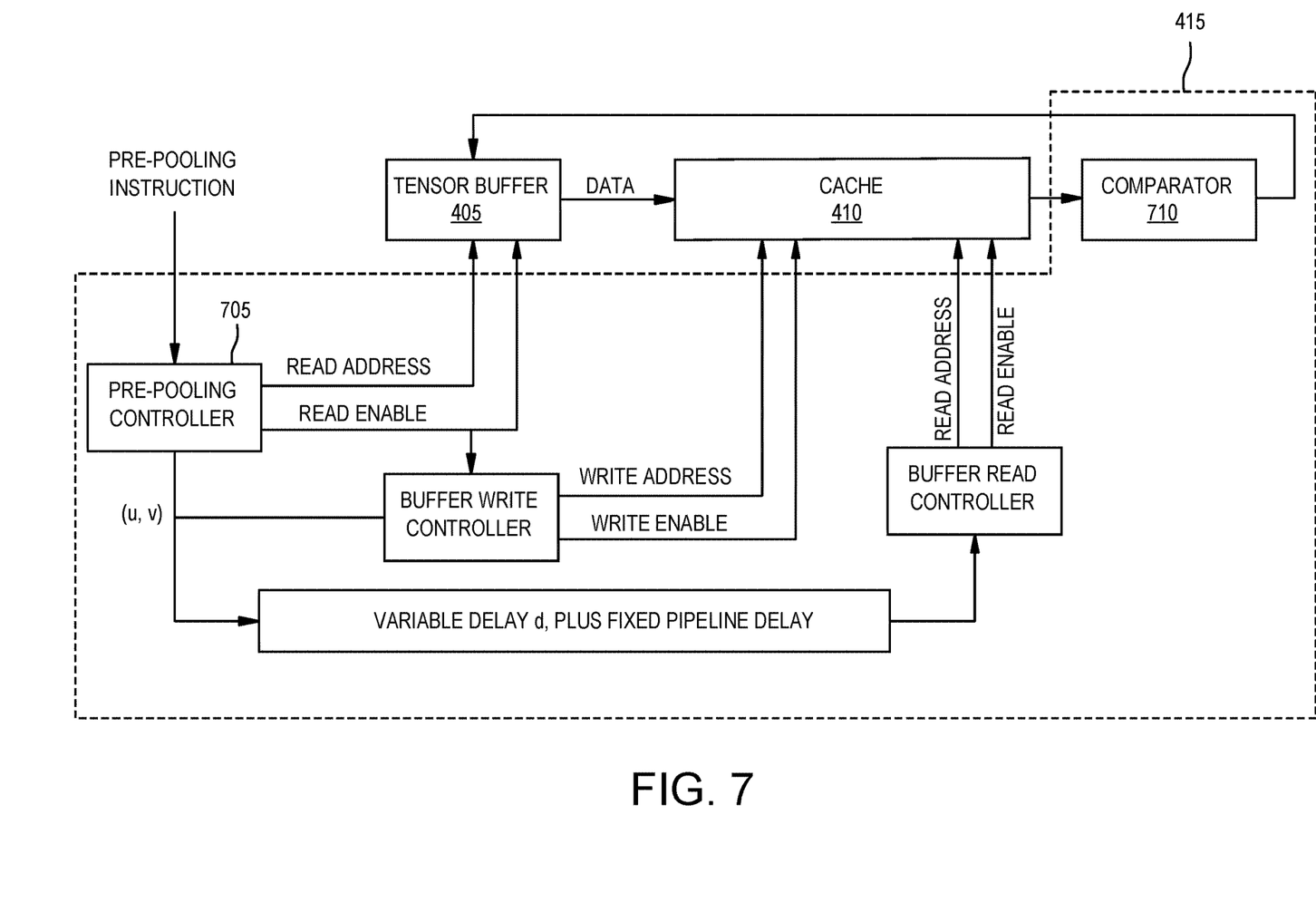
FIG. 7 illustrates circuitry for a pre-pooling input cache, according to an example.

FIG. 7 illustrates circuitry for a pre-pooling input cache, according to an example. In more detail, FIG. 7 illustrates an example implementation of a pre-pooler cache controller 705 for a fire-and-forget pre-pooler 415. A fire-and-forget design simplifies the controller 705 by eliminating flow control. An upstream instruction unit sends a pre-pooling instruction to the pre-pooler cache controller 705 to begin the pre-pooling operation—e.g., the pre-pooling operation illustrated at Time A in FIG. 4B.

In one embodiment, the controller 705 generates three addresses and their corresponding enable control signals that include: (i) tensor buffer read address and enable, (ii) pre-pooler input cache write address and enable, and (iii) pre-pooling input cache read address and enable.

In one embodiment, the pre-pooler 415 performs a max-pooling operation using a comparator 710 where the comparator 710 selects the maximum value given a set of input value. The pre-pooler 415 can perform the max-pooling comparisons sequentially or in one parallel step. It is often more economical to perform the comparison sequentially since the pre-pooling operation occurs in parallel with convolution (as illustrated in FIG. 4B) which often takes many cycles. When the pre-pooler 415 computes the comparison sequentially, a loop-back path exists between the comparator 710 and the tensor buffer 405.

The pre-pooler 415 illustrated in FIG. 7 has several advantages such the upstream instruction unit does not need to monitor the detailed operations of the pre-pooler 415. The instruction unit sends hyper-parameters to the pre-pooler 415 and waits for the results to be stored in the tensor buffer 405. Also, once the pre-pooler controller 705 starts reading the tensor buffer 405, the comparator 710 starts data comparison some time later and does not pause (e.g., a fire-and-forget model). Moreover, with a read-write schedule such as as-soon-as possible versus as-late-as-possible, the cache 410 size can be selected so that the cache 410 never overflows or underflows. For example, for an as-late-as-possible schedule, the cache size can be only eight elements for inception modules in a nested neural network.

In alternative embodiments, the small input cache 410 can be eliminated and its associated read and write controllers from the circuitry illustrated in FIG. 7. However, this is at the expense of higher read bandwidth and therefore higher read energy from the large tensor buffer 405. Moreover, the pooling operation performed by the pre-pooler 415 is not limited to max-pooling, and average pooling can be performed instead.

Figure 8:
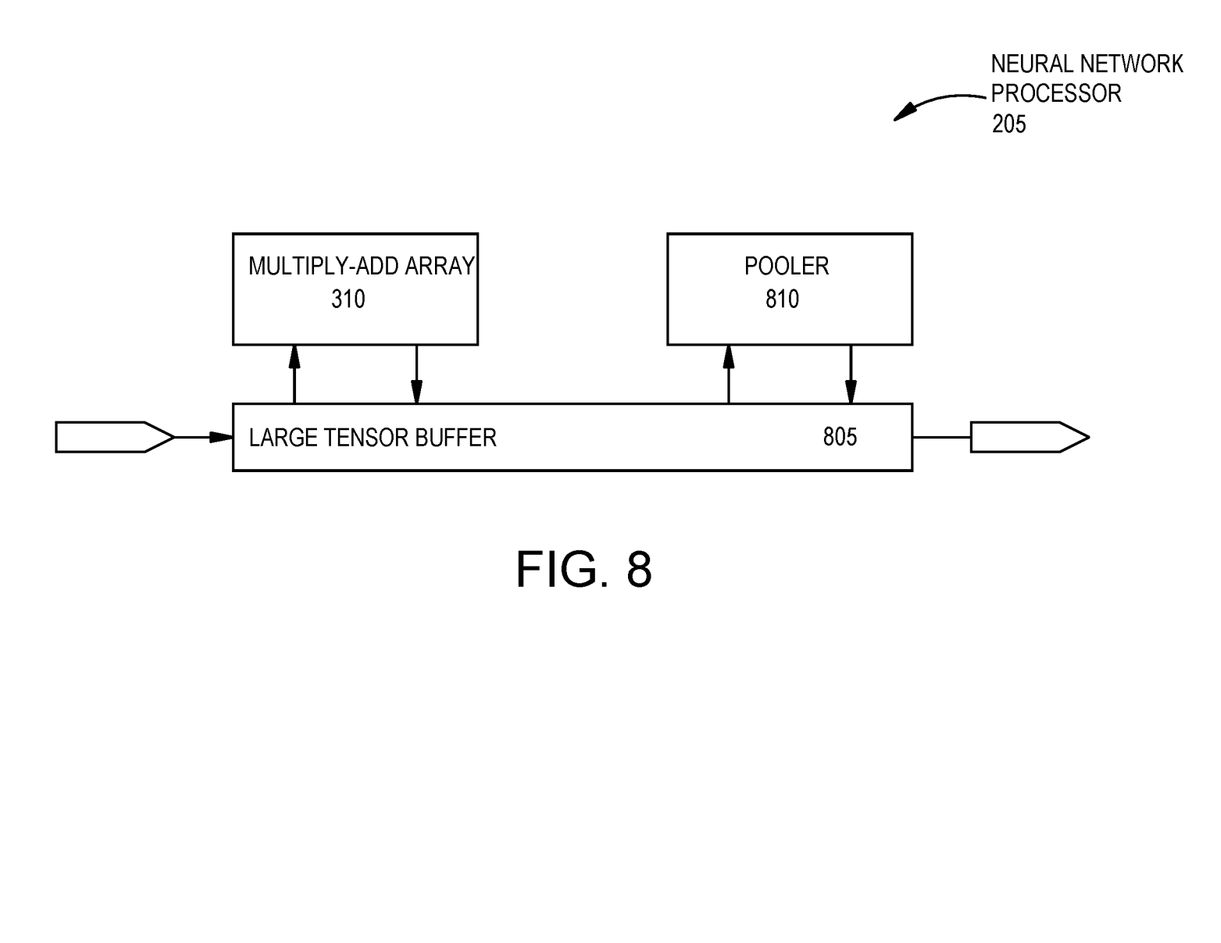
FIG. 8 illustrates circuitry for executing layers in a nested neural network, according to an example.

FIG. 8 illustrates circuitry for executing layers in a nested neural network, according to an example. Specifically, FIG. 8 illustrates an alternative embodiment to the neural network processor design illustrated in FIG. 4A. That is, FIG. 8 illustrates an alternative (non-inline) implementation of the neural network processor 205 that simplifies the circuitry at the potential cost of experiences the multiply-add array stall (i.e., the idle time illustrated in FIG. 3B) when a pooler 810 performs the pre-pooling operation for the layer 105E.

An additional issue with the circuitry in FIG. 8 is that because the pooler 810 is not in line with the multiply-add array 310 (in contrast to the in-line circuitry in FIG. 4A), a large amount of storage is required between the multiply-add array 310 and the pooler 810, which means the tensor buffer 805 may be larger than the tensor buffer 405 in FIG. 4B. Given that a max-pooler of stride greater than one sub-samples the data tensor coming out of the multiply-add array 310, an inline max-pooler (like the one in FIG. 4A) first reduces the data tensor size before the data tensor is stored in the tensor buffer for use in the next layer. When sizing the tensor buffer, the intermediate tensor between the multiply-add array and the inline post-pooler therefore does not need to be considered, as a small buffer is sufficient.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
   a plurality of neural network processors, each comprising:
   a multiply-add array,
   a first pooler,
   a second pooler, and
   a tensor buffer configured to store a tensor generated by a previous layer in a neural network, wherein inputs of the first pooler and the multiply-add array are coupled to the tensor buffer and an output of the first pooler is coupled to an input of the tensor buffer, wherein the multiply-add array is the only multiply-add array coupled to the tensor buffer and the first pooler is separate from the multiply-add array, and wherein an input of the second pooler is coupled to an output of the multiply-add array,
   wherein the first pooler is configured to process the tensor for a first layer in the neural network while the multiply-add array processes the tensor for a second layer in the neural network.

2. The integrated circuit of claim 1, wherein each of the plurality of neural network processors further comprises:
   a bypass path around the second pooler; and
   a multiplexer, wherein a first end of the bypass path is coupled to the output of the multiply-add array and a second end of the bypass path is coupled to the multiplexer, and wherein an output of the second pooler is coupled to the multiplexer.

3. The integrated circuit of claim 2, wherein an output of the multiplexer is coupled to the tensor buffer in another one of the plurality of neural network processors.

4. The integrated circuit of claim 3, wherein the output of the multiplexer is also coupled to the tensor buffer such that data generated by the second pooler and data transmitted on the bypass path can be stored in the tensor buffer via a feedback path.

5. The integrated circuit of claim 2, wherein the tensor buffer comprises a dedicated scratch pad memory page configured to store intermediate tensor data that is generated by the multiply-add array and bypasses the second pooler using the bypass path.

6. The integrated circuit of claim 1, wherein the tensor buffer comprises a dedicated write memory page configured for storing data generated by the first pooler.

7. The integrated circuit of claim 6, further comprising:
a cache disposed between the input of the first pooler and the tensor buffer, wherein the cache is configured to read data from a first memory page in the tensor buffer while the first pooler stores processed data in the dedicated write memory page.

8. The integrated circuit of claim 1, wherein the tensor buffer is a two read (2R) memory element such that the first pooler and the multiply-add array can read from the tensor buffer in parallel.

9. The integrated circuit of claim 8, wherein the tensor buffer comprises a plurality of memory pages each comprising a plurality of memory blocks, wherein each of the plurality of memory blocks has at most one read port.

10. A circuit, comprising:
a multiply-add array configured to perform an operation for a first layer in a neural network, wherein the first layer is a linear layer;
a pre-pooler configured to perform a pre-pooling operation for a second layer in the neural network;
a post-pooler configured to perform a post-pooling operation for a third layer in the neural network; and
a tensor buffer configured to store a tensor generated by a fourth layer in the neural network, wherein inputs of the pre-pooler and the multiply-add array are coupled to the tensor buffer and an output of the pre-pooler is coupled to the tensor buffer, and wherein an input of the post-pooler is coupled to an output of the multiply-add array,
wherein the multiply-add array is the only multiply-add array coupled to the tensor buffer and the pre-pooler and the post-pooler are separate from the multiply-add array.

11. The circuit of claim 10, further comprising:
a bypass path around the post-pooler; and
a multiplexer, wherein a first end of the bypass path is coupled to the multiply-add array and a second end of the bypass path is coupled to the multiplexer, and wherein an output of the post-pooler is coupled to the multiplexer.

12. The circuit of claim 11, wherein an output of the multiplexer is coupled to a second tensor buffer.

13. The circuit of claim 12, wherein the output of the multiplexer is also coupled to the tensor buffer via a feedback path such that data generated by the post-pooler and data transmitted on the bypass path can be stored in the tensor buffer.

14. The circuit of claim 11, wherein the tensor buffer comprises a dedicated scratch pad memory page configured to store intermediate tensor data that is generated by multiply-add array and bypasses the post-pooler using the bypass path.

15. The circuit of claim 10, wherein the tensor buffer comprises a dedicated write memory page configured to store data generated by the pre-pooler.

16. A method comprising:
storing a tensor outputted from a previous layer in a neural network in a tensor buffer;
processing the tensor using a first lower layer in the neural network by reading the tensor from a first page of the tensor buffer;
storing the processed tensor in a scratch pad page of the tensor buffer;
performing a first operation on the processed tensor using a multiply-add array,
wherein the first operation corresponds to an upper layer in the neural network that is downstream from the first lower layer;
while performing the first operation, performing a first pooling operation using a pre-pooler corresponding to a second lower layer in the neural network by reading the tensor from the first page of the tensor buffer; and
while performing the first operation and the first pooling operation, performing a second pooling operation in a post-pooler using data generated by the upper layer;
wherein the multiply-add array is the only multiply-add array coupled to the tensor buffer and the pre-pooler and the post-pooler are separate from the multiply-add array.

17. The method of claim 16, further comprising:
storing data from performing the first pooling operation in a dedicated memory page in the tensor buffer; and
storing data from performing the second pooling operation in a different tensor buffer.

18. The method of claim 17, wherein only the pre-pooler that performs the first pooling operation can write data into the dedicated memory page.

19. The method of claim 18, further comprising:
retrieving the stored data from the dedicated memory page; and
performing a second operation on the stored data using the multiply-add array.

20. The method of claim 19, wherein the multiply-add array performs the first operation and the second operation back-to-back without any idle time.

* * * * *